(12) United States Patent
Kim (10) Patent No.: US 12,236,821 B1
(45) Date of Patent: Feb. 25, 2025

(54) FLEXIBLE TRANSPARENT DISPLAY USING ULTRA SHORT THROW PROJECTION OPTICAL MODULE

(71) Applicant: PRAZEN Co., Ltd, Gyunggi-do (KR)

(72) Inventor: Heekyung Kim, Gyunggi-do (KR)

(73) Assignee: PRAZEN Co., Ltd, Gyunggi-do (KR)

( * ) Notice: Subject to any disclaimer, the term of this patent is extended or adjusted under 35 U.S.C. 154(b) by 0 days.

(21) Appl. No.: 18/524,888

(22) Filed: Nov. 30, 2023

(30) Foreign Application Priority Data

Nov. 29, 2023 (KR) .................. 10-2023-0169938

(51) Int. Cl.
| | |
|---|---|
| *G06F 1/16* | (2006.01) |
| *G03B 21/58* | (2014.01) |
| *G03B 21/62* | (2014.01) |
| *G06F 3/042* | (2006.01) |
| *G06F 3/16* | (2006.01) |
| *G06V 20/20* | (2022.01) |
| *G09G 3/00* | (2006.01) |

(52) U.S. Cl.
CPC ............. *G09G 3/035* (2020.08); *G03B 21/58* (2013.01); *G03B 21/62* (2013.01); *G06F 3/042* (2013.01); *G06F 3/167* (2013.01); *G06V 20/20* (2022.01); *G09G 3/002* (2013.01); *G06F 2203/04102* (2013.01); *G09G 2354/00* (2013.01); *G09G 2360/144* (2013.01)

(58) Field of Classification Search
CPC ......... G06F 3/042; G06F 3/167; G06V 20/20; G09G 3/002; G09G 3/035; G09G 2354/00
See application file for complete search history.

(56) References Cited

U.S. PATENT DOCUMENTS

2015/0253487 A1\* 9/2015 Nichol ................ G02B 6/0018
362/610
2023/0408826 A1\* 12/2023 Oh ........................ G02F 1/1368

\* cited by examiner

*Primary Examiner* — Sanghyuk Park
(74) *Attorney, Agent, or Firm* — IP & T GROUP LLP (57) ABSTRACT

The present invention relates to a compact mobile display device, and more specifically, to a portable display implemented by mounting an ultra-short-throw projection optical module on a transparent, flexible, or hard substrate to project a projection image. In the present invention, when the ultra-short-throw projection optical module is mounted and the substrate that projects the image is made of a flexible and transparent material that can be bent, folded, or rolled, the user can enjoy augmented reality that overlaps reality through a transparent display. In addition to viewing images, it is possible to conveniently carry the display device by bending, folding, or rolling it while viewing the expanded display.

19 Claims, 8 Drawing Sheets

FLEXIBLE TRANSPARENT DISPLAY USING ULTRA SHORT THROW PROJECTION OPTICAL MODULE

CROSS-REFERENCE TO RELATED APPLICATION

This application claims priority under 35 U.S.C. § 119 to Korean Patent Application No. 10-2023-0169938 filed on Nov. 29, 2023, which is incorporated herein by reference in its entirety

FIELD OF THE INVENTION

The present invention relates to a compact transparent flexible display device, and more specifically, to a portable display device implemented by mounting an ultra-short-throw projection unit on a flexible, transparent or opaque substrate to project a projection image.

BACKGROUND OF THE INVENTION

Recently, in the display industry, extensive research and development has been conducted to diversify form factors such as size and shape of displays in order to improve display visibility and user convenience.

In the existing display industry, the most important types of displays being developed are transparent displays with transparent display panels and flexible displays that can bend, fold, or roll the display panel.

However, in flat displays such as existing OLED (Organic Light Emitting Display), LCD (Liquid Crystal Display), EPD (Electrophoretic Display), and Micro LED (Micro Light Emitting Display), among display panels that emit light for display images, it is essential to place components such as TFTs, switches, electrical wiring, color filters, and black matrix that drive the panel on the lower or upper side of each pixel where active materials such as liquid crystal or light-emitting materials are located.

In addition, in order to manufacture a transparent or flexible display using these existing flat panel displays, not only the active material of the display panel, but also the components such as TFT, switch, electrical wiring, color filters and black matrix that drive the panel on the lower or upper side of each pixel where the active material is located must all be made of transparent or flexible materials.

This is a very challenging technology in current display technology, and it is known that it is very difficult to commercialize transparent or flexible displays to date because it is difficult to find suitable materials and requires very complex and highly difficult process technology.

Therefore, an innovative break through display is essential to effectively implement a transparent and flexible display using components different from those of existing flat panel displays.

Unlike existing methods, the present invention suggests a technology that can easily implement a transparent or flexible display using an innovative display device including a compact ultra-short throw optical module and a substrate equipped with the ultra-short throw optical module.

PRIOR ART LITERATURE

Patent Document

Patent Document 1: KR 2019-0116193 A

SUMMARY OF THE INVENTION

The present invention, unlike transparent displays or flexible displays produced using existing flat panel display technologies such as OLED or LCD, provides a display device that can dramatically improve the transparency and flexibility of the display, allowing users to easily fold, bend, or roll it, and easily adjust transparency, by applying an ultra-short-throw projection method which does not require individual driving components arranged for each pixel of the panel required for existing flat panel displays.

In addition, the present invention provides a compact display device that can efficiently provide augmented reality images that overlap with reality without being worn on the head like glasses.

According to the present invention, there is provided a transparent flexible display device, including a base plate; an ultra-short-throw projection unit with a projection ratio of 0.1 or less, mounted on one or both sides of the base plate; a driving unit of the ultra-short-throw projection unit; and a reflective surface provided on at least a portion of one surface of the base plate to form a virtual image by reflecting projection light output from the projection unit.

According to an embodiment of the present invention, the base plate may be made of a transparent or translucent material with a transmittance of 10% or more.

According to an embodiment of the present invention, the base plate may be made of a flexible material that may be folded, rolled, or bent.

According to an embodiment of the present invention, the ultra-short-throw projection unit may include optical elements of a plurality of lenses, mirrors, or prisms.

According to an embodiment of the present invention, the ultra-short-throw projection unit may have the maximum length in the vertical or horizontal direction measured based on the optical axis direction, the length being 10 cm or less.

According to an embodiment of the present invention, a film or optical device for user touch recognition may be provided on the upper or lower side of the base plate.

According to an embodiment of the present invention, the transmittance of the reflective surface may be 10% or more.

According to an embodiment of the present invention, the transparent flexible display device may further include an optical photonic microstructure on one surface of the base plate.

According to an embodiment of the present invention, the base plate and the reflective surface may be made of a flexible material, may be rolled or folded, and may have a light transmittance of 10% or more.

According to an embodiment of the present invention, the flexible materials of the base plate may include compound made of at least one selected from polyimide, acrylonitrile butadiene styrene polymer, acrylic polymer, celluloid polymer, cellulose acetate polymer, cycloolefin copolymer, ethylene-vinyl acetate polymer, ethylene vinyl alcohol polymer, polyacetal polymer, polyacrylate polymer, polymethylmethacrylate polymer, polyacrylonitrile polymer, polyaryl ether ketone polymer, polybutadiene polymer, polybutylene polymer, polybutylene terephthalate polymer, polycaprolactone polymer, polychlorotrifluoroethylene polymer, and polytetrafluoroethylene polymer.

According to an embodiment of the present invention, at least one projection unit may be wrapped around the base plate or folded centered on the bending line.

According to an embodiment of the present invention, the flexible display device may further include an RGB camera, a stereo camera, or a TOF camera, an acceleration sensor, a geomagnetic sensor, or a proximity sensor.

According to an embodiment of the present invention, the flexible display device, using an RGB camera, stereo camera, or TOF camera, an acceleration sensor, a geomagnetic sensor, or a proximity sensor, may have software to project a virtual image around an object in the real space based on the location information of the display device recognized in the real space.

According to an embodiment of the present invention, the base plate may include an electro-active device, and the electro-active device further includes an electrical driving unit so that transmittance may be adjusted by controlling voltage application.

According to an embodiment of the present invention, the base plate may further include a photochromic element in addition to the electro-active element.

According to the present invention, there is provided a transparent flexible display device, comprising: a base plate made of transparent and flexible material with a transmittance of 10% or more; an ultra-short throw projection unit with a throw ratio of 0.1 or less, mounted on one or both sides of the base plate; a driving unit of the ultra-short-throw projection unit; a reflective surface provided on at least a portion of one surface of the base plate to form a virtual image by reflecting the projection light output from the projection unit; a camera unit and a proximity sensor for recognition of surrounding objects; and an application processor unit that executes software algorithms used to project virtual images around real-world objects.

According to an embodiment of the present invention, the transparent flexible display device may further include a touch screen film attached to one surface of the base plate or the reflective surface in order to control the transparent flexible display device by a touch method.

According to an embodiment of the present invention, the transparent flexible display device may further include a microphone device; and a driving processor that recognizes the user's voice input through the microphone device and controls the display device using the voice.

According to an embodiment of the present invention, the transparent flexible display device may further include an illuminance sensor for the surrounding environment to control the voltage applied to the base place using the value measured by the illuminance sensor.

Effects

In the present invention, when the substrate on which the ultra-short-throw projection optical module is mounted and projects the image is made of a transparent material, in case that a transparent display is placed in front of the real object, the user can realistically experience augmented reality linked to reality through the image projected from the real object and the transparent display.

In addition, in the present invention, when the substrate on which the ultra-short-throw projection optical module is mounted and projects the image is made of a flexible material that can be bent, folded, or rolled, the user can conveniently carry by bending, folding or rolling the display device while viewing the expanded display on a large screen.

In addition, in the present invention, the complex transparent and flexible PCB (printed circuit board) and related components required to make the existing transparent and flexible display are unnecessary. Since the display substrate can be constructed using only a simple flexible plastic material, the display device using an ultra-short-throw projection optical module according to the present invention can greatly simplify the manufacturing process, reduce weight, and significantly reduce manufacturing costs compared to existing flexible transparent displays. In addition, since the flexibility required to fold, bend, or roll the substrate is greatly improved, the shape variability of the entire display device can be greatly improved, allowing users to modify and use the display in a very convenient form that suits them.

DETAILED DESCRIPTION OF THE EMBODIMENTS

Hereinafter, embodiments of the present invention will be described in detail so that those skilled in the art can easily implement the present invention. However, the present invention may be implemented in many different forms and is not limited to the embodiments described herein.

The flexible display device according to the present invention includes a base plate 30, a projection unit 20, which is an ultra-short-throw projection optical module provided on one or both sides of the base plate 30, a driving unit of the projection unit 20, and a reflective surface 40 formed on one side of the base plate 30.

Among the terms used in this specification, the projection unit 20 is a device that includes a predetermined optical system and projects light on a projection surface according to an input image signal. It may have a very short focal length, for example, a projection distance of 0.2 to 0.6 m or a projection ratio of 0.1 or less. Accordingly, the projection unit 20 may be used interchangeably with the terms ultra-short-throw projection optical module or projection optical module.

Figure 1:
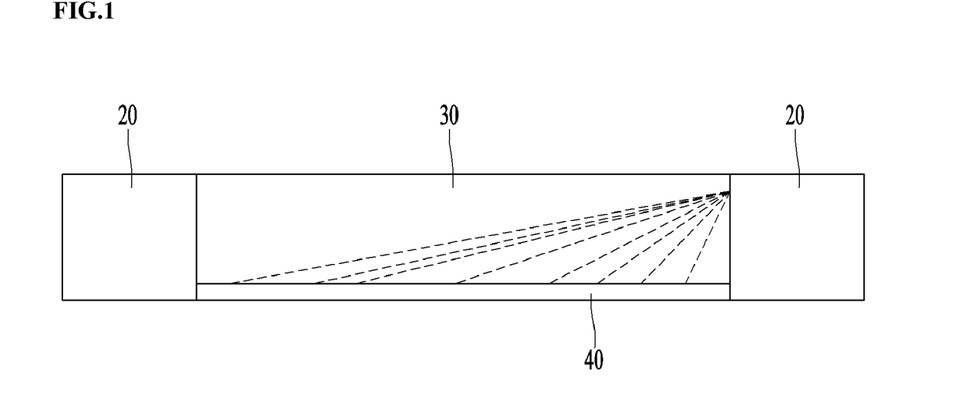
FIGS. 1 to 3 are cross-sectional views of a flexible display device using an ultra-short-throw projection optical module according to an embodiment of the present invention.
Figure 2:
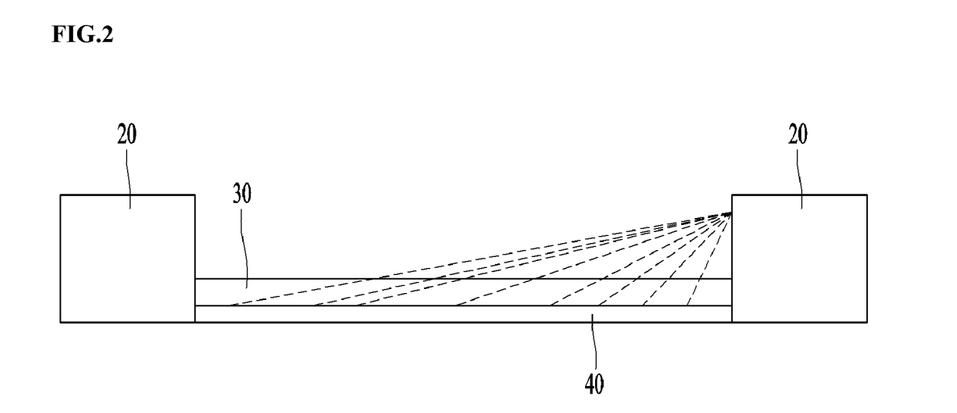

FIGS. 1 and 2 are cross-sectional views of a flexible display device equipped with an ultra-short-throw projection optical device according to an embodiment of the present invention. FIGS. 1 and 2 illustrate that the projection unit 20 may be provided at both ends of the base plate 30, but the present invention is not limited to this, and the projection unit 20 is provided only at one end, not both sides, of the base plate 30.

The base plate 30 is a projection plate for image light emitted from the projection unit 20, and may include a material such as glass or plastic. For example, when a transparent display is to be implemented, the base plate 30 may be made of a transparent glass substrate, tempered glass, or transparent plastic. In addition, when using a plastic material as the base plate 30, the plastic material is made of thermoplastic resin, preferably may be at least one selected from PET (PolyEthylene Terephthalate), PEN (PolyEthylene Naphthalate), PES (PolyEther Sulfone), PI (PolyImide), PAR (PolyARylate), PC (PolyCarbonate), PMMA (PolyMethyl MethAcrylate), PU (PolyUrethane), TAC (Tri-Acrtyl-Cellulose), or COC (Cycloolefin Copolymer).

This base plate 30 may have a multi-layer structure in which two or more of the tempered glass and plastic substrates are laminated, rather than a single layer.

In addition, the base plate 30 or the reflective surface 40, which will be described later, may include a flexible material. According to a preferred embodiment, the base plate 30 or the reflective surface 40 may include materials such as transparent and flexible plastic.

For example, as a material that provides flexibility to the base plate 30 or the reflective surface 40, polyimide especially colorless polyimide, other thermoplastic and materials or resins, glass fiber, glass beads, and fillers such as carbon fiber are used. Other thermoplastic resins include, for example, a compound made of at least one selected from acrylonitrile butadiene styrene polymer, acrylic polymer, celluloid polymer, cellulose acetate polymer, cycloolefin copolymer, ethylene-vinyl acetate polymer, ethylene vinyl alcohol copolymer, polyacetal polymer, polyacrylate polymer, Polymethyl methacrylate polymer, polyacrylonitrile polymer, polyaryl ether ketone polymer, polybutadiene polymer, polybutylene polymer, polybutylene terephthalate polymer, polycaprolactone polymer, polychlorotrifluoroethylene polymer, and polytetra fluoroethylene polymer. By using such a flexible material, the base plate 30 or the reflective surface 40 can achieve touch screen compatibility along with optical properties.

The transparent display device according to an embodiment of the present invention allows the user to view the image through the transparent display device over the real world, and the virtual augmented reality image is projected and formed on the base plate 30 and the reflective surface provided on at least one side thereof. Here, the reflective surface 40 may serve as a screen that displays virtual object information projected from the projection unit 20, that is, an augmented reality image.

The display device according to an embodiment of the present invention may include an interface means to receive user input such as a control command on the upper or lower surface of the base plate 30 or the reflective surface 40. In a specific embodiment, the interface means is a touch screen that uses a touch method for user input, and can be laminated on one side of the base plate 30 as a film.

A display device according to an embodiment of the present invention may include a camera to recognize the surrounding space or object and map it to a pre-stored map, etc. to recognize the current location. At this time, the present invention does not limit the type of camera, but for example, it may be a ToF camera or a stereo camera.

Additionally, the display device according to an embodiment of the present invention may include an acceleration sensor, a geomagnetic sensor, and a proximity sensor.

Additionally, the display device according to an embodiment of the present invention may include an audio input/output device such as a microphone or speaker.

In addition, the display device according to an embodiment of the present invention includes a driving semiconductor (AP, CPU) for controlling the operation of the display device, camera device, acceleration sensor, geomagnetic sensor, proximity sensor, audio input/output device, etc., and driving unit made of peripheral components for the driving semiconductor operation. It may include a memory 130 that stores the operating system SW of the driving unit.

In addition, the display device according to an embodiment of the present invention stores in the memory 130 program of Simultaneous Localization and Mapping (SLAM) function to project a virtual image around a real object by mapping the position of the real space recognized through the camera device or the sensors and execute it.

In addition, the display device according to an embodiment of the present invention stores in memory 130 program for voice recognition processing as well as the microphone device, as described above in order to control the operation of various components according to control commands generated by recognizing and processing the user's voice input and execute it.

In addition, as described above, the display device according to an embodiment of the present invention can store in the memory 130 a program for receiving and processing a touch input from a user, for example, a touch screen driving program and execute it.

Meanwhile, as described above, the projection unit 20 according to an embodiment of the present invention is a device for projecting an image including an augmented reality image related to a surrounding real object onto a transparent projection surface to form an image. The projection unit 20 may include an ultra-short-throw projection lens assembly composed of optical elements such as a plurality of lenses, mirrors, and prisms, and may further include a micro-display, a light source, a driving circuit, a board, a chip, a battery, etc.

The transparent flexible display device according to an embodiment of the present invention preferably includes a projection unit 20 with a minimized size through advanced optical design to increase portability.

The throw ratio (TR) of the projection unit 20 is the ratio between the projection distance, which refers to the distance (d) between the projection unit 20 and the screen, and the horizontal size (L) of the projection screen (TR=d/L), the lower the projection ratio, the more possible it is to implement a larger screen at the same projection distance. In the transparent flexible display device according to an embodiment of the present invention, the projection unit 20 is attached to the base plate 30, the reflective surface 40, or their laminate 50, which serves as a projection surface or screen. Accordingly, the shorter the projection distance, the smaller the size of the projection unit 20 can be, and further, a more compact transparent flexible display device can be implemented.

Therefore, in order to compact the projection unit 20 in the transparent flexible display device according to an embodiment of the present invention, it is desirable to keep the projection ratio of the projection unit 20 small in order to project a projection image of an appropriate size onto the base plate 30, the reflective surface 40, or a laminate 50 thereof while shortening the projection distance to make the projection unit 20 compact.

In one embodiment of the present invention, when the projection ratio of the projection unit 20 is set to 0.1 and the projection distance is set to 5.31 cm in a transparent flexible display device, the size of the projection unit 20 is as small as 6 cm, making it easy to hold in the user's hand. Further, it is possible to implement a display device that provides a 27-inch transparent flexible large screen that can be folded, rolled, or bent while providing a conveniently compact feel.

| Projection-based transparent flexible display embodiment (TR = 0.1) | |
| --- | --- |
| Throw Ratio | 0.10 |
| Throw Distance (cm) | 5.31 |
| Optical module size (cm) | 6 |
| Screen width (cm) | 53.10 |
| Screen diagonal length (cm) - 27 inches | 68.58 |

Another embodiment of the present invention is that in a transparent flexible display device, when the projection ratio of the projection unit 20 is set to 0.07 and the projection distance is set to 3.72 cm, the size of the projection unit 20 is as small as 4 cm, so it can fit in the user's hand. It provides a compact feel that is very convenient to hold, and it is possible to implement a display device that provides a 27-inch transparent flexible large screen that can be folded, rolled, or bent while being extremely convenient to carry.

| Projection-based transparent flexible display embodiment (TR = 0. 07) | |
| --- | --- |
| Throw Ratio | 0.07 |
| Throw Distance (cm) | 3.72 |
| Optical module size (cm) | 4 |
| Screen width (cm) | 53.10 |
| Screen diagonal length (cm) - 27 inches | 68.58 |

Another embodiment of the present invention is that when the projection ratio of the projection unit 20 in a transparent flexible display device is set to 0.07 and the projection distance is set to 2.32 cm, the size of the projection optical module is as small as about 2.5 cm, making it easy to hold in the user's hand. It is possible to implement a display device that provides a very convenient, compact feel and is extremely portable, while providing a 15-inch transparent flexible large screen that can be folded, rolled, or bent.

| Projection-based transparent flexible display embodiment (TR = 0.1) | |
| --- | --- |
| Throw Ratio | 0.10 |
| Throw Distance (cm) | 3.32 |
| Optical module size (cm) | 4 |
| Screen width (cm) | 33.20 |
| Screen diagonal length (cm) - 15 inches | 38.1 |

In another embodiment of the present invention, when the projection ratio of the projection unit 20 is set to 0.07 and the projection distance is set to 2.32 cm in a transparent flexible display device, the size of the projection optical module is as small as 2.5 cm, so that it can be held in the user's hand. It is compact enough to be very convenient to use, and it is possible to implement a display device that provides a 15-inch transparent flexible large screen that can be folded, rolled, or bent while being extremely portable.

| Projection-based transparent flexible display embodiment (TR = 0. 07) | |
| --- | --- |
| Throw Ratio | 0.07 |
| Throw Distance (cm) | 2.32 |
| Optical module size (cm) | 2.5 |
| Screen width (cm) | 33.20 |
| Screen diagonal length (cm) - 15 inches | 38.1 |

Another embodiment of the present invention is to maintain the projection ratio of the projection unit 20 as low as 0.1 or less in a transparent flexible display device, and to make the size of the projection unit 20 very small to a level similar to a short projection distance. Although it is a highly difficult technology that requires advanced optical technology, it is possible to actually implement it through optical simulation design based on an appropriate combination of optical lenses, prisms, and mirrors, as described in Korean Patent Publication No. 2019-0116193, a cited document.

In the transparent flexible display device according to an embodiment of the present invention, the transmittance of the projection unit 20, the reflective surface 40, or their laminate 50 is determined to maximize the clarity of the image incident from the projection unit 20 and formed. The transmittance can be adjusted to an appropriate range of 10% or more and 100% or less to increase the transmittance.

As used herein, the term "transmittance" refers to the amount of incident light passing through a sample measured according to ASTM D1003 at a thickness of 3.2 mm. In addition, it is preferable that the projection unit 20, the reflective surface 40, or their laminate 50 according to an embodiment of the present invention be a film with a transmittance of 30% to 95%, but it may vary depending on the amount of external light and the user's needs. Accordingly, the transmittance can range from 0% to 100% by using materials, composition methods, and changes in thickness to have an appropriate transmittance. Among the terms used in this specification, "transparent display" refers to a display other than one side of the base plate 30, the reflective surface 40, or their stack 50, on which the light from the projection unit 20 is projected. It means providing a level of transmittance that can recognize objects located behind it, and unless specified, there is no particular limitation on the range of transmittance.

The base plate 30, the reflective surface 40, or their stack body 50, which projects light from the projection unit 20, can be implemented in various ways, not just a simple combination of materials.

According to a specific embodiment, the base plate 30 includes an electro-active device such as a polymer dispersed liquid crystal (PDLC) device, a liquid crystal cell, a Pokels device, or a Kerr device, so that the transmittance can be adjusted by voltage application control. Further, PDLC film or a similar type of active film can be added to the base plate 30.

The driving processor 110 adjusts the voltage applied to the base plate 30 using an active element such as PDLC appropriately according to the amount of external light to vary the transmittance, thereby adjusting the base plate on which the projection light output from the projection unit 20 enters. (30), a problem that may occur when the transmittance of the reflective surface 40, or their laminate 50 is fixed, that is, a trade-off between visibility to the real world and the clarity of the projected image when the transmittance increases. By improving the Off) problem, it is possible to secure high clarity for augmented reality images while ensuring visibility for objects in the real world.

To this end, the transparent flexible display device according to an embodiment of the present invention may further include an illumination sensor for the amount of external (or surrounding) light, and the driving processor 110 may detect the external (or surrounding) light sensed by the illumination sensor. The voltage applied to the base plate 30 using an active device such as PDLC can be adjusted according to the light quantity information.

In contrast, the base plate 30 of a transparent flexible display device according to another embodiment of the present invention includes a photochromic element whose transmittance automatically changes depending on the amount of external (or surrounding) light, and by ensuring that the base plate 30 provides optimal transmittance according to the amount of external (or surrounding) light without using the value detected by the illuminance sensor. So, high clarity of augmented reality images is achieved while ensuring visibility of objects in the real world. can be secured.

Meanwhile, the base plate 30 according to an embodiment of the present invention forms an optical photonic structure on one side of the base plate 30 on which the image light incident from the projection unit 20 is incident, thereby converting the image light to Sharpness can be greatly improved. These optical photonic structures can be formed in various ways.

For example, it is formed by mixing a translucent bead such as silica with a UV or heat-curing resin and coating it on one side of a transparent or translucent base plate 30 and curing it, or by coating it with a UV or heat-curing resin and then optically curing it. The photonic structure can be formed by pressing and curing a sheet or roll mold with an engraved shape, or by transferring a film or sheet coated with UV or thermosetting resin to one side of the base plate 30. forming, or forming by molding with a mold having a shape that matches the optical photonic structure, or applying a predetermined mask to one side of the base plate 30 and coating it with resin, etc., and then performing processes such as exposure or etching. It can be formed by forming an optical photonic structure and then removing the mask. Alternatively, it may be formed using a deposition process. That is, it can be formed by directly printing using UV or thermosetting ink on one surface of the transparent or translucent base plate 30 using a laser beam. Alternatively, a physical impact may be applied directly to the surface of the base plate 30 to form an optical photonic structure on the surface.

The optical photonic structure formed in the manner described above may be formed on the upper surface of the base plate 30 or on one side of the reflective surface 40 facing one side of the base plate 30.

Regarding the size of the optical photonic structure according to an embodiment of the present invention, the pitch may be 1 μm to 100 μm, but the present invention is not limited thereto.

By adding a photonic structure to one side of the base plate 30 according to an embodiment of the present invention, even when the amount of light incident from the projection unit 20 is small, the user can clearly see objects in the real world while still using the base plate. A virtual image implemented on the plate 30, the reflective surface 40, or their stack body 50 can also be clearly seen at the same time.

Figure 3:
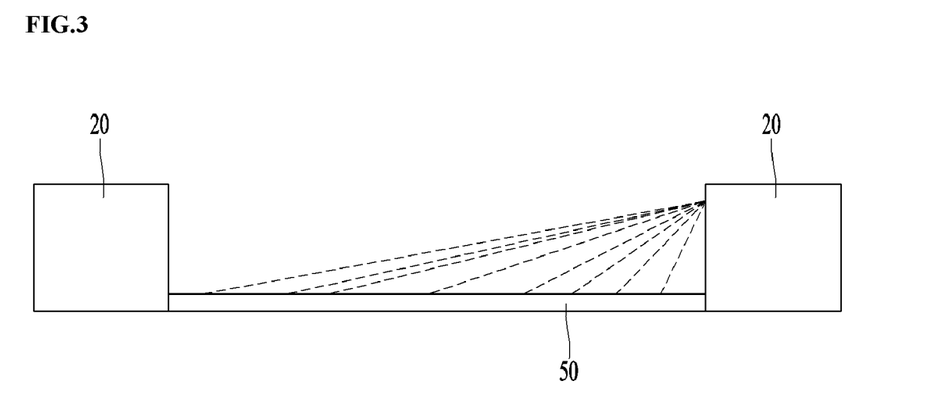

Meanwhile, FIG. 3 is a cross-sectional view of a flexible display device using an ultra-short-throw projection optical module according to an embodiment of the present invention.

As shown in FIG. 3, the transparent flexible display device according to the present invention includes a laminate 50 of a base plate 30 and a reflective surface 40, and an ultra-short-throw projection unit provided on one or both sides of the laminate 50.

That is, a lamination formed by stacking the base plate 30 and the reflective surface 40 included in the flexible display device using the ultra-short-throw projection optical module 20 of FIGS. 1 and 2 in the thickness direction, as shown in FIG. 3. By using the sieve 50, the components can be simplified. Here, the laminate 50 in which the base plate 30 and the reflective surface 40 are stacked may further include a translucent element, for example, an optical photonic structure, inside and/or outside.

Figure 4:
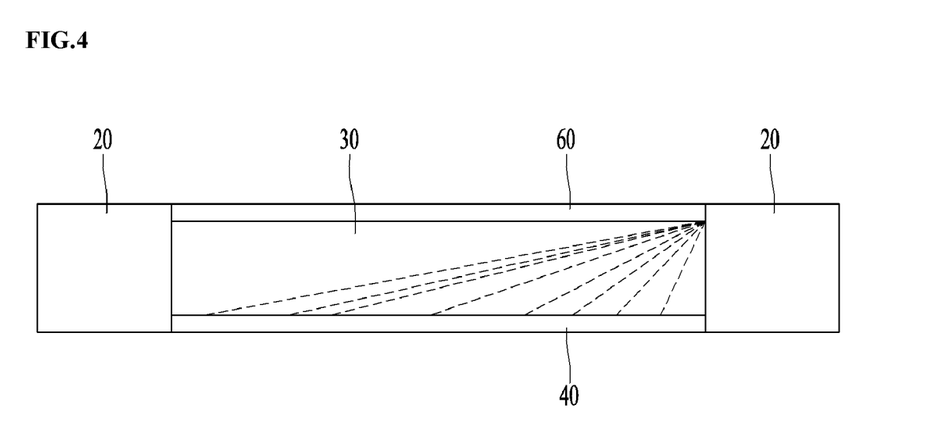
FIGS. 4 to 6 are schematic diagrams of a flexible display device using an ultra-short-throw projection optical module with a touch recognition device according to an embodiment of the present invention.
Figure 5:
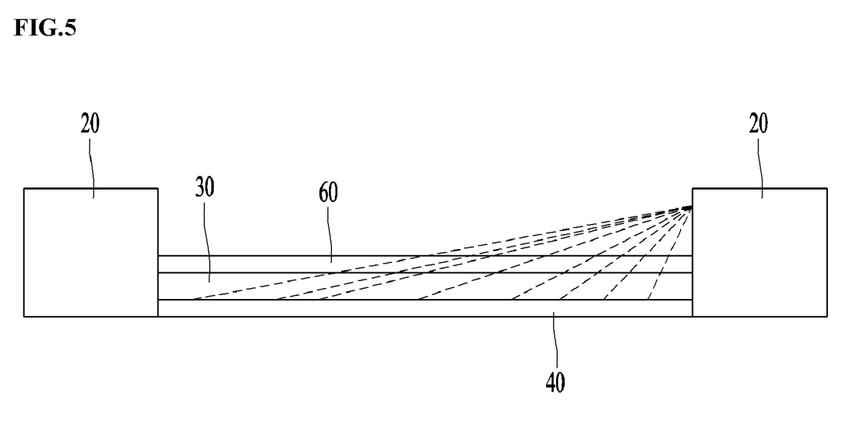

FIGS. 4 and 5 are cross-sectional views of a flexible display device using an ultra-short-throw projection optical module according to an embodiment of the present invention.

As shown in FIGS. 4 and 5, the transparent flexible display device according to the present invention includes a base plate 30, a projection unit 20 provided on one or both sides of the base plate 30, and an ultra-short focus projection unit 20. It may include a driving unit, a reflective surface 40 provided on one side of the base plate 30, specifically the lower side, and a touch screen film 60 provided on the other side of the base plate 30.

Figure 6:
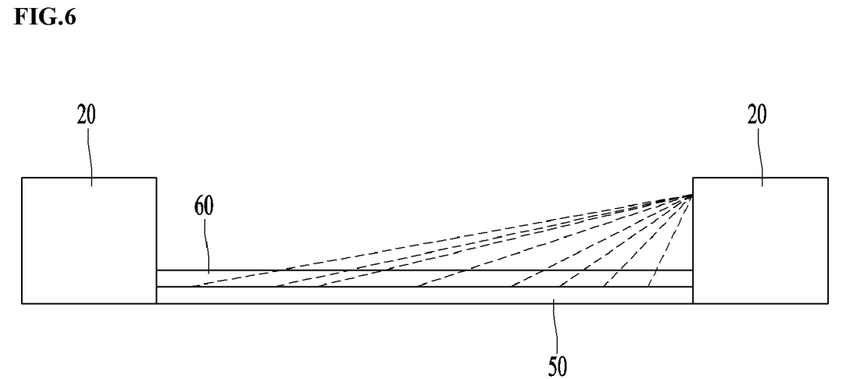

The flexible display device shown in FIGS. 4 to 6 is identical to the flexible display device in FIGS. 1 to 3 except that the touch screen film is attached to the other side, preferably the top side, of the base plate 30.

In addition, although the projection unit 20 is provided on both sides of the base plate 30 in FIGS. 4 to 6, the present invention is not limited to this and may be provided on only one side of the base plate 30.

Figure 7:
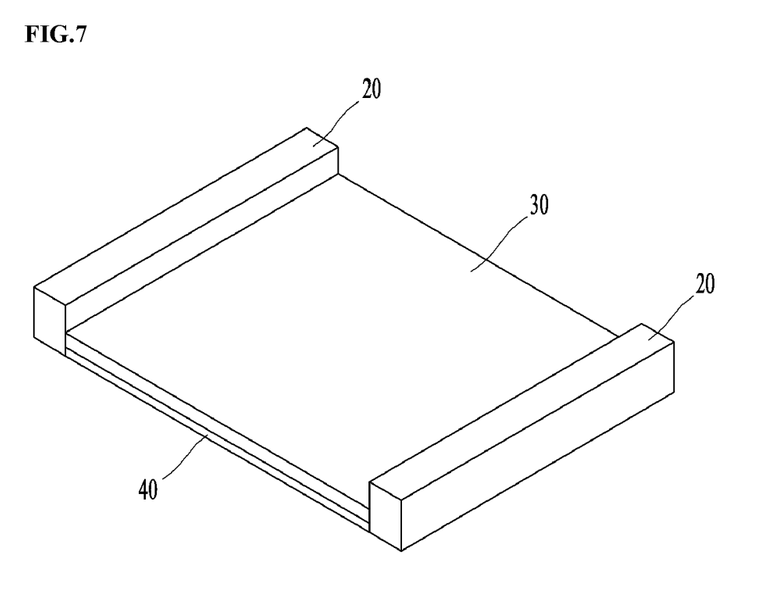
FIG. 7 is a diagram showing the overall appearance of a flexible display device using an ultra-short-throw projection optical module according to an embodiment of the present invention.

Meanwhile, FIG. 7 is a diagram showing the overall appearance of a flexible display device using an ultra-short-throw projection optical module according to an embodiment of the present invention.

As shown in FIG. 7, it may include a base plate 30 made of glass or acrylic resin, and ultra-short focus projection units 20 provided on both sides of the base plate 30. Here, the projection unit 20 may be provided on both sides of the base plate 30, but as described above, of course, it may also be provided on only one side of the base plate 30.

The driving processor 110 can output and implement various images by projecting projection light onto the translucent reflective surface 40 through the projection unit 20. Accordingly, the augmented reality image is displayed to the user overlapping the real world environment through the transparent base plate 30, allowing the user to view the real world environment and the virtual image together.

When the user sees the real environment through the base plate 30 of the transparent flexible display device according to an embodiment of the present invention, the camera provided in the transparent flexible display device can scan obstacles around the user, and scan Using the information, the driving processor 110 can create a map including location information measure the current location using a previously created map. Accordingly, the driving processor 110 can provide a realistic augmented reality image to the user by projecting projection light on a virtual image corresponding to the current location through the projection unit 20.

Figure 8:
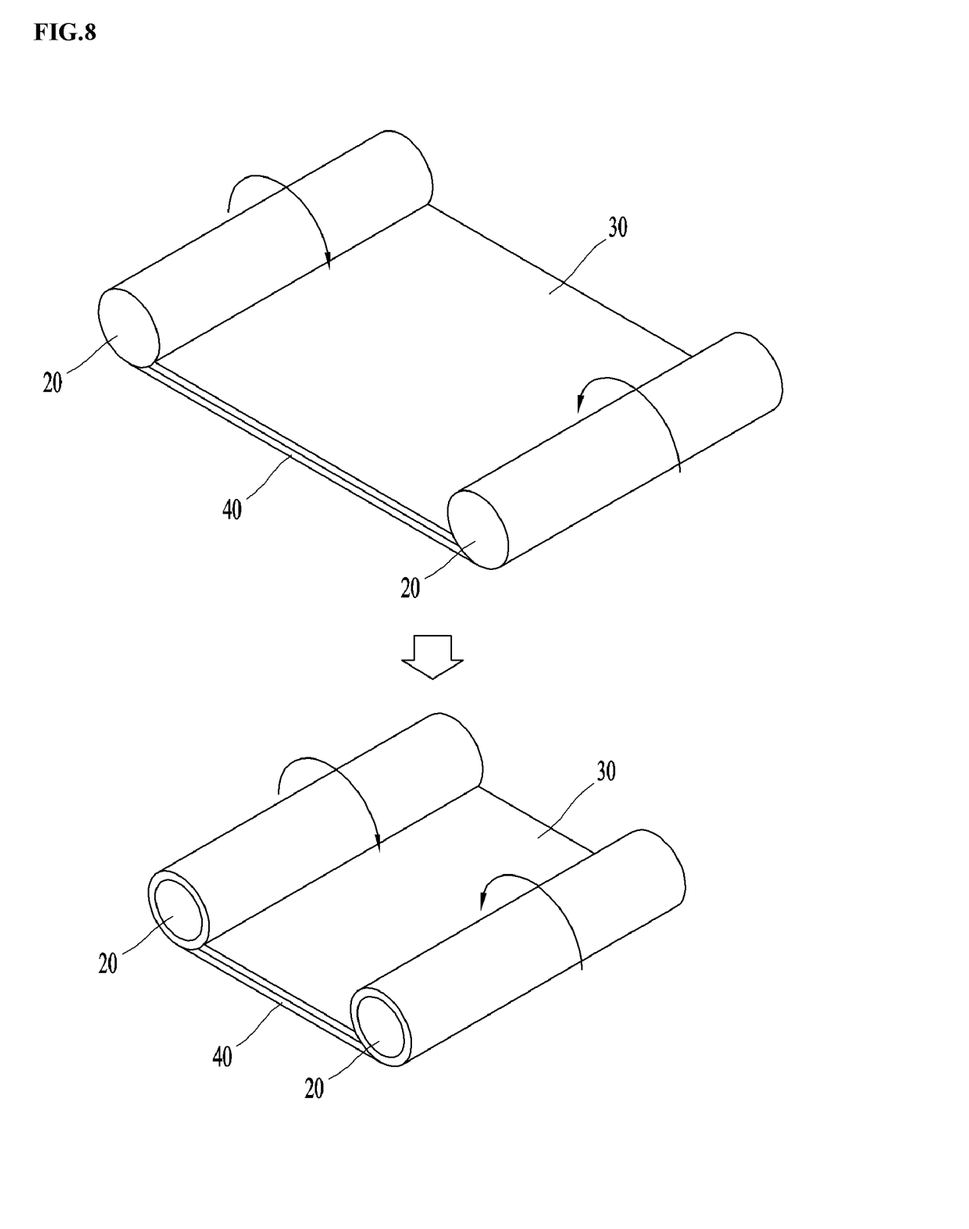
FIG. 8 is a schematic diagram of a roller-type flexible display device according to an embodiment of the present invention.

Meanwhile, FIG. 8 is a schematic diagram of a roller-type flexible display device according to an embodiment of the present invention.

As shown in FIG. 8, the transparent or translucent base plate 30 can be rolled into a scroll shape, and for this purpose, the base plate 30, a reflective surface 40 provided on one side thereof, or a laminate 50 thereof can be a flexible plastic or polymer material that can be rolled into a roll.

At this time, the transparent flexible display device according to an embodiment of the present invention is a projection unit can be driven only when the base plate 30, the reflective surface 40, or their stack 50, which is rolled up in a scroll shape by the user, is unfolded.

The transparent flexible display device according to the present embodiment can implement a large area display image when unfolded. In contrast, when the flexible display device is not used, the base plate 30 and the reflective surface 40 are used as if rolling a scroll or by rolling up the laminate 50 thereof, so that the overall size of the transparent flexible display device can be miniaturized and portability can be increased.

Figure 9:
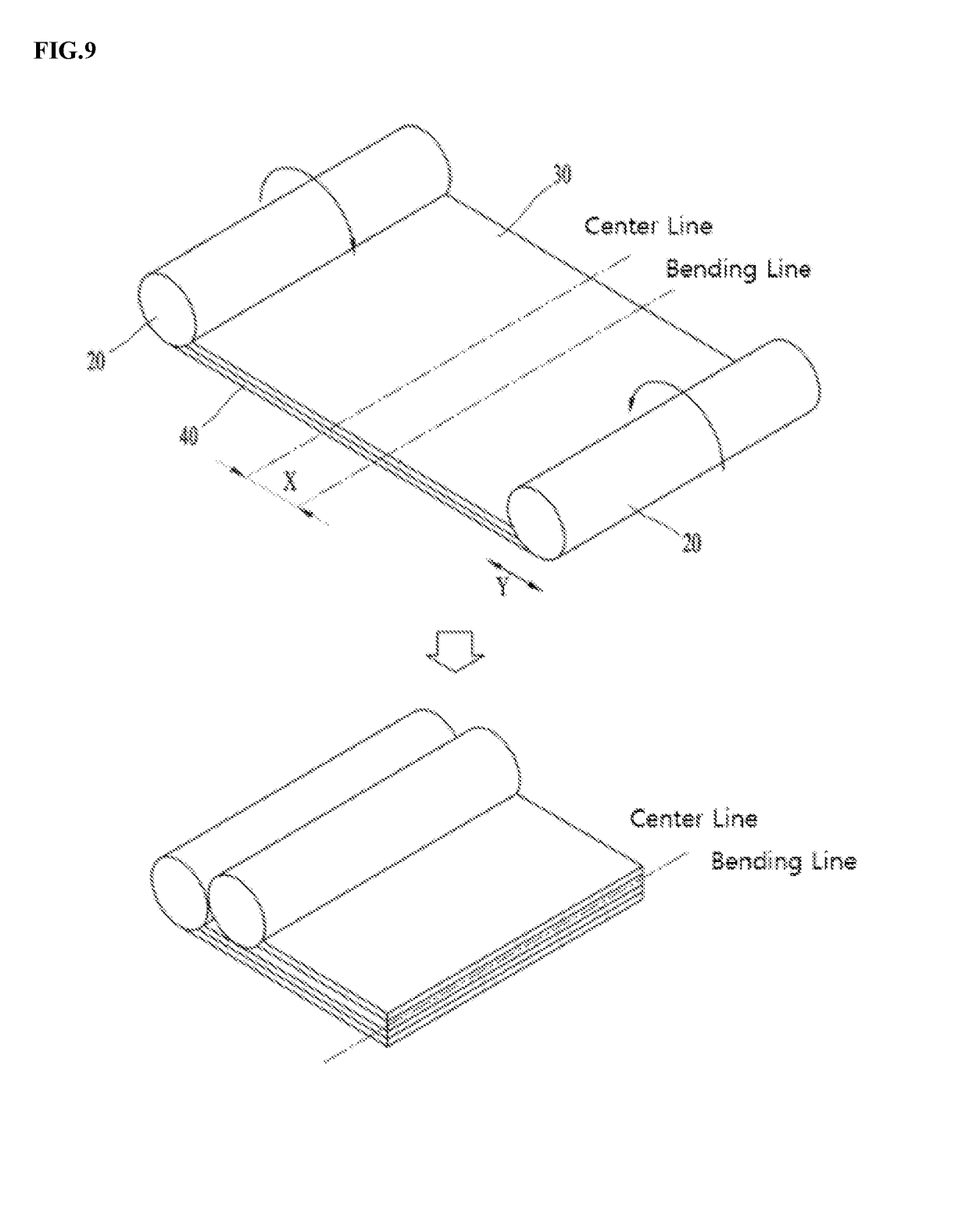
FIG. 9 is a schematic diagram of a folder-type transparent flexible device display according to an embodiment of the present invention.

Meanwhile, FIG. 9 is a schematic diagram of a folder-type transparent flexible display device according to an embodiment of the present invention.

As shown in FIG. 9, a transparent and foldable plastic or polymer material can be used as a material for the base plate 30.

At this time, the transparent flexible display device according to an embodiment of the present invention can drive the projection unit 20 only when the base plate 30 (in the folded state), the reflective surface 40, or their stack 50 is in an unfolded state (or when expanded) by the user.

The transparent flexible display device according to this embodiment can implement a large area display image when unfolded. In contrast, when the flexible display device is not used, the overall size of the transparent flexible display device can be miniaturized and portability by folding the base plate 30, the reflective surface 40 or their laminate 50 with reference to the bending line.

Here, the middle of the width between both ends of the base plate 30, the reflective surface 40, or their laminate 50, or the base plate 30, the reflective surface 40, or their laminate (A line extending in the longitudinal direction between the projection units 20 provided at both ends of the 50) is taken as the center line, and a portion where the base plate 30, the reflecting surface 40, or their laminate 50 is folded. can be used as a bending line, and in this case, the distance (X) between the center line and the bending line may be longer than the length (Y) in the width direction of the projection unit 20.

That is, when the distance (X) between the center line and the bending line is longer than the length (Y) in the width direction of the projection unit 20, the base plate 30, the reflective surface 40, or their laminate 50 When folded based on the bending line, the projection units 20 provided on both sides do not overlap each other without interfering with each other, enabling miniaturization.

Figure 10:
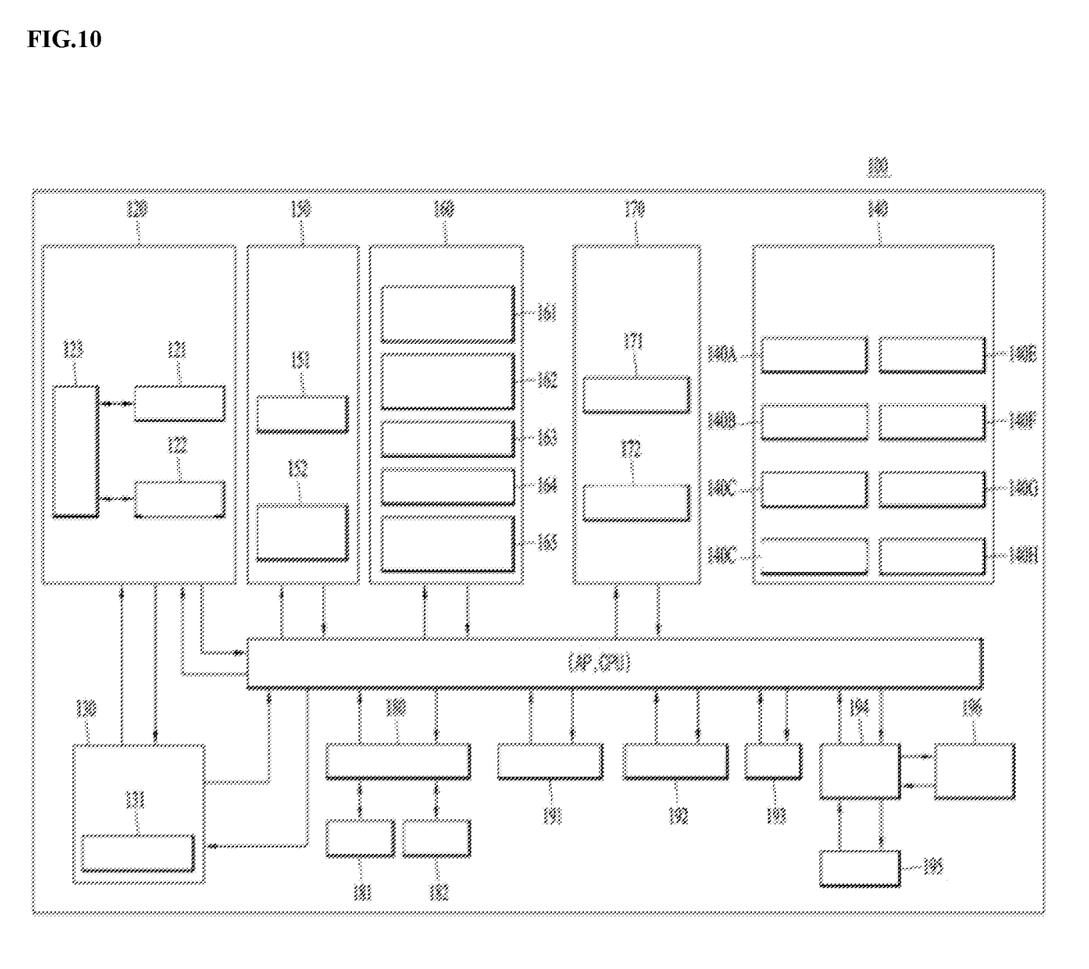
FIGS. 10 and 11 are configuration diagrams of a transparent flexible display device according to an embodiment of the present invention.

Meanwhile, FIG. 10 is a configuration diagram of a transparent flexible display device according an to embodiment of the present invention. A flexible display device according to an embodiment of the present invention may include a communication module 120, an input device 150, a display module 160, an interface 170, or a sensor module 140, and the communication module 120, input device 150, display module 160, interface 170, or sensor module 140 may be linked to a driving processor 110 such as an AP or CPU. Additionally, the driving processor 110 may be linked to the memory 130, the audio module 180, the camera module 191, the indicator 192, the motor 193, or the power management module 194.

Here, the communication module 120 may include a WiFi module 121, a BT module 122, or an RF module 123, and the input device 150 may include a key 151 or a touch screen module 152. It may include, and the display module 160 may include a display component 161, a display driving module 162, a contrast module 163, a projection module 164, or a micro display module 165, and an interface 170 may include HDMI 171 or USB 172, and the sensor module 140 includes a gesture sensor 140A, a gyro sensor 140B, an acceleration sensor 140C, an ultrasonic sensor 140D, and an infrared sensor. It may include 140E, a hall sensor 140F, a proximity sensor 140G, or an illumination sensor 140H.

Figure 11:
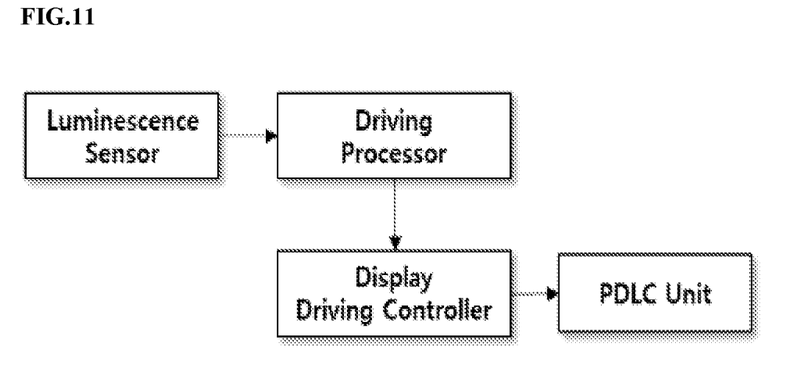

Meanwhile, as shown in FIG. 11, the transparent flexible display device according to an embodiment of the present invention can detect external brightness using an illuminance sensor, and the driving processor 110 controls the base plate by controlling the display driving device. The transmittance of the base plate 30 can be adjusted by adjusting the voltage applied to the PCLD element.

In addition to this, the transmittance of the base plate 30 and/or the brightness of the light output from the projection unit 20 may be arbitrarily adjusted by user input.

Although the present disclosure and its advantages have been described in detail, it should be understood that various changes, substitutions and modifications may be made herein without departing from the spirit and scope of the disclosure as defined by the appended claims. Additionally, the scope of the present application is not intended to be limited to specific embodiments of the processes, manufacturing, compositions of materials, means, and methods described herein. Those skilled in the art will recognize that, from this disclosure, currently existing or future developed processes, manufacturing, etc. that perform substantially the same function or achieve substantially the same results as the corresponding embodiments described herein; It will be readily understood that compositions of materials, means, and methods may be used in accordance with the present disclosure. Accordingly, the appended claims are intended to cover such processes, manufactures, compositions of materials, means, and methods.

What is claimed is:

1. A transparent flexible display device, comprising:
   base plate;
   an ultra-short-throw projection unit with a projection ratio of 0.1 or less, mounted on one or both sides of the base plate;
   a driving unit of the ultra-short-throw projection unit; and
   a reflective surface provided on at least a portion of one surface of the base plate to form a virtual image by reflecting projection light output from the projection unit.

2. The transparent flexible display device according to claim 1, wherein the base plate is made of a transparent or translucent material with a transmittance of 10% or more.

3. The transparent flexible display device according to claim 1, wherein the base plate is made of a flexible material that may be folded, rolled, or bent.

4. The transparent flexible display device according to claim 1, wherein the ultra-short-throw projection unit includes optical elements of a plurality of lenses, mirrors, or prisms.

5. The transparent flexible display device according to claim 1, wherein the ultra-short-throw projection unit has a maximum length in the vertical or horizontal direction measured based on an optical axis direction, the maximum length being 10 cm or less.

6. The transparent flexible display device according to claim 1, wherein a film or optical device for user touch recognition is provided on an upper or lower side of the base plate.

7. The transparent flexible display device according to claim 1, wherein the transmittance of the reflective surface is 10% or more.

8. The transparent flexible display device according to claim 1, further comprising an optical photonic microstructure on one surface of the base plate.

9. The transparent flexible display device according to claim 1, wherein the base plate and the reflective surface are made of a flexible material, may be rolled or folded, and have a light transmittance of 10% or more.

10. The transparent flexible display device according to claim 3, wherein the flexible materials of the base plate include compound made of at least one selected from polyimide, acrylonitrile butadiene styrene polymer, acrylic polymer, celluloid polymer, cellulose acetate polymer, cycloolefin copolymer, ethylene-vinyl acetate polymer, ethylene vinyl alcohol polymer, polyacetal polymer, polyacrylate polymer, polymethylmethacrylate polymer, polyacrylonitrile polymer, polyaryl ether ketone polymer, polybutadiene polymer, polybutylene polymer, polybutylene terephthalate polymer, polycaprolactone polymer, polychlorotrifluoroethylene polymer, and polytetrafluoroethylene polymer.

11. The transparent flexible display device according to any one of claims 1 to 10, wherein at least one projection unit may be wrapped around the base plate or folded centered on a bending line.

12. The transparent flexible display device according to claim 11, wherein the flexible display device further comprises an RGB camera, a stereo camera, or a TOF camera, an acceleration sensor, a geomagnetic sensor, or a proximity sensor.

13. The transparent flexible display device according to claim 11, wherein the flexible display device, using an RGB camera, stereo camera, or TOF camera, an acceleration sensor, a geomagnetic sensor, or a proximity sensor, has software to project a virtual image around an object in a real space based on the location information of the display device recognized in the real space.

14. The transparent flexible display device according to claim 11, wherein the base plate includes an electro-active device, and the electro-active device further includes an electrical driving unit so that transmittance may be adjusted by controlling voltage application.

15. The transparent flexible display device according to claim 1, wherein the base plate further includes a photochromic element in addition to the electro-active element.

16. A transparent flexible display device, comprising:
base plate made of transparent and flexible material with a transmittance of 10% or more;
an ultra-short throw projection unit with a throw ratio of 0.1 or less, mounted on one or both sides of the base plate;
a driving unit of the ultra-short-throw projection unit;
a reflective surface provided on at least a portion of one surface of the base plate to form a virtual image by reflecting the projection light output from the projection unit;
a camera unit and a proximity sensor for recognition of surrounding objects; and
an application processor unit that executes software algorithms used to project virtual images around real-world objects.

17. The transparent flexible display device according to claim 16, further comprising a touch screen film attached to one surface of the base plate or the reflective surface in order to control the transparent flexible display device by a touch method.

18. The transparent flexible display device according to claim 16, further comprising:
a microphone device; and
a driving processor that recognizes the user's voice input through the microphone device and controls the display device using the voice.

19. The transparent flexible display device according to claim 16, further comprising an illuminance sensor for a surrounding environment to control a voltage applied to the base place using a value measured by the illuminance sensor.

* * * * *